(12) United States Patent
Fleming et al.

(10) Patent No.: US 10,913,049 B2
(45) Date of Patent: *Feb. 9, 2021

(54) COMPOSITIONS AND METHODS FOR PRODUCING HIGH PURITY FILTER AIDS

(71) Applicant: Imerys USA, Inc., Roswell, GA (US)

(72) Inventors: Robert Fleming, San Jose, CA (US); Nicholas Jose, San Jose, CA (US); Jeffrey D. Taniguchi, Santa Maria, CA (US); Bo Wang, Union City, CA (US)

(73) Assignee: Imerys USA, Inc., Roswell, GA (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/541,587

(22) PCT Filed: Jan. 13, 2016

(86) PCT No.: PCT/US2016/013267
§ 371 (c)(1),
(2) Date: Jul. 5, 2017

(87) PCT Pub. No.: WO2017/003515
PCT Pub. Date: Jan. 5, 2017

(65) Prior Publication Data
US 2018/0263263 A1 Sep. 20, 2018

Related U.S. Application Data

(60) Provisional application No. 62/102,897, filed on Jan. 13, 2015.

(51) Int. Cl.
*B01J 20/30* (2006.01)
*C12H 1/044* (2006.01)
(Continued)

(52) U.S. Cl.
CPC .......... *B01J 20/3071* (2013.01); *A23L 2/80* (2013.01); *B01D 39/2003* (2013.01);
(Continued)

(58) Field of Classification Search
CPC ........ A23L 2/80; C12H 1/0408; B01J 20/106; B01J 20/14; B01J 20/28083;
(Continued)

(56) References Cited

U.S. PATENT DOCUMENTS 1,992,547 A * 2/1935 Schuetz .................. B01J 20/14
502/408
4,134,857 A * 1/1979 Bradley ................. B01D 37/02
502/401
(Continued)

FOREIGN PATENT DOCUMENTS

| EP | 0 790 070 A1 | 8/1997 |
| GB | 2 056 485 A | 3/1981 |

OTHER PUBLICATIONS

International Search Report and Written Opinion dated Feb. 7, 2017, in International Application No. PCT/US2016/013267 (12 pgs.).
(Continued)

*Primary Examiner* — Liam Royce
(74) *Attorney, Agent, or Firm* — Finnegan, Henderson, Farabow, Garrett & Dunner, LLP

(57) ABSTRACT

A filter aid may include acid-washed diatomaceous earth having high purity, and perlite. A method of making a high purity filter aid may include acid washing diatomaceous earth to reduce the h in the diatomaceous earth, and combining the acid-washed diatomaceous earth with high purity perlite to obtain to obtain a high purity filter aid. A method of reducing extractable metals from diatomaceous earth may include washing the diatomaceous earth in a first acid, rinsing the diatomaceous earth, and washing the diatoma- (Continued)

ceous earth in a second acid. The first acid may include an inorganic acid having a first strength, and the second acid may include an organic acid having a second strength different than the first strength. A method of filtering a beverage may include passing the beverage through a filter including a filter aid including acid-washed diatomaceous earth having high purity, and perlite.

6 Claims, 9 Drawing Sheets

(51) Int. Cl.
    *A23L 2/80*     (2006.01)
    *B01J 20/10*     (2006.01)
    *B01J 20/14*     (2006.01)
    *B01D 39/20*     (2006.01)
    *C04B 20/02*     (2006.01)
    *C04B 28/26*     (2006.01)
    *B01J 20/28*     (2006.01)
    *C04B 111/00*     (2006.01)

(52) U.S. Cl.
    CPC ............ *B01J 20/106* (2013.01); *B01J 20/14* (2013.01); *C04B 20/023* (2013.01); *C04B 28/26* (2013.01); *C12H 1/0408* (2013.01); *B01D 2239/10* (2013.01); *B01D 2239/1208* (2013.01); *B01D 2239/1216* (2013.01); *B01D 2239/1241* (2013.01); *B01D 2239/1258* (2013.01); *B01J 20/28002* (2013.01); *B01J 20/28059* (2013.01); *B01J 20/28076* (2013.01); *B01J 20/28083* (2013.01); *C04B 2111/00284* (2013.01); *C04B 2111/00793* (2013.01); *Y02W 30/91* (2015.05)

(58) Field of Classification Search
    CPC ............ B01J 20/28059; B01J 20/28002; B01J 20/28076; B01D 39/2003; B01D 2239/1258; B01D 2239/1241; B01D 2239/1208; B01D 2239/10; B01D 2239/1216; C04B 28/26; C04B 20/023; C04B 2111/00284; C04B 2111/00793
    See application file for complete search history.

(56) References Cited

U.S. PATENT DOCUMENTS

| | | | |
|---|---|---|---|
| 4,142,968 A * | 3/1979 | Nielsen | C12H 1/0408 502/412 |
| 5,656,568 A | 8/1997 | Shiuh et al. | |
| 5,776,353 A | 7/1998 | Palm et al. | |
| 5,908,561 A * | 6/1999 | Palm | B01D 39/06 210/193 |
| 7,524,794 B2 | 4/2009 | Boddu et al. | |
| 8,663,475 B2 | 3/2014 | Lu | |
| 2009/0264287 A1 | 10/2009 | Wang et al. | |
| 2011/0223301 A1 | 9/2011 | Ting et al. | |

OTHER PUBLICATIONS

Sulpizio et al., "Advances in Disposable Diatomite Filter Aid Systems for CGMP Bioseperations", AFSS Annual Meeting, May 20, 2008, pp. 1-7.

Imerys Performance & Filtration Minerals, "Celite 545", World Minerals, Feb. 2009, p. 1, [retrieved fromhttp://www.imerys-oilfieldsoultions.com/Library/PDS/CELITE_545_Quincy_US.pdf.

Supplementary European Search Report dated Aug. 9, 2018, in corresponding European Application No. 16818364.8 (7 pgs.).

* cited by examiner

COMPOSITIONS AND METHODS FOR PRODUCING HIGH PURITY FILTER AIDS

CLAIM FOR PRIORITY

This application is a U.S. national phase entry of International Application No. PCT/US2016/013267, filed Jan. 13, 2016, which claims the benefit of priority of U.S. Provisional Patent Application No. 62/102,897, filed Jan. 13, 2015, to both of which this application claims the benefit of priority, and the entirety of the subject matter of both of which is incorporated herein by reference.

FIELD OF THE DESCRIPTION

This disclosure is related to compositions and methods for filter aids, and more particularly, to compositions and methods for filters aids having high purity.

BACKGROUND

In many filtration applications, a filtration device may include a filter element, such as a septum, and a filter-aid material. The filter element may be of any form such that it may support a filter-aid material. For example, the filter element may include a cylindrical tube or wafer-like structure covered with a plastic or metal fabric of sufficiently fine weave. The filter element may be a porous structure with a filter element void to allow material of a certain size to pass through the filtration device. The filter-aid material may include one or more filtration components, which, for example, may be inorganic powders or organic fibrous materials. Such a filter-aid material may be used in combination with a filter element to enhance filtration performance.

For example, the filter-aid material may initially be applied to a septum of a filter element in a process known as "pre-coating." Pre-coating may generally involve mixing a slurry of water and filter-aid material, and introducing the slurry into a stream flowing through the septum. During this process, a thin layer, such as, for example, about 1.5 mm to about 3.0 mm, of filter-aid material may eventually be deposited on the septum, thus forming the filtration device.

During filtration of a fluid, various insoluble particles in the fluid may become trapped by the filter-aid material. The combined layers of filter-aid material and particles and/or constituents to be removed accumulate on the surface of the septum. Those combined layers are known as "filter cake." As more particles and/or constituents are deposited on the filter cake, the filter cake may become saturated with debris to the point where fluid is no longer able to pass through the septum.

To combat this situation, a process known as "body feeding" may be used. Body feeding is the process of introducing additional filter-aid material into the fluid to be filtered before the fluid reaches the filter cake. The filter-aid material will follow the path of the unfiltered fluid and will eventually reach the filter cake. Upon reaching the filter cake, the added filter-aid material will bind to the cake in a similar manner to how the filter-aid material is bound to the septum during the pre-coating process. The additional layer of filter-aid material may cause the filter cake to swell and thicken, and may increase the capacity of the filter cake to entrap additional debris. The filter aid typically has an open porous structure, which maintains an open structure in the filter cake, thus improving the likelihood of continued permeability of the filter cake.

In the field of fluid filtration, diatomaceous earth, also known as diatomite or "DE," may be employed as a filter aid, and methods of particle separation from fluids may employ diatomaceous earth products as filter aids. The intricate and porous structure unique to diatomaceous earth may, in some instances, be effective for the physical entrapment of particles in filtration processes. It is known to employ diatomaceous earth products to improve the clarity of fluids that exhibit "turbidity," or contain suspended particles or particulate matter. "Turbidity" is the cloudiness or haziness of a fluid, where the haziness may be caused by individual particles that are suspended in the fluid. Materials that may cause a fluid to be turbid include, for example, clay, silt, organic matter, inorganic matter, and microscopic organisms.

Diatomaceous earth may be used in various aspects of filtration. For example, as a part of pre-coating, diatomaceous earth products may be applied to a filter septum to assist in achieving, for example, any one or more of protection of the septum, improvement in clarity, and expediting of filter cake removal. As a part of body feeding, diatomaceous earth may be added directly to a fluid being filtered to assist in achieving, for example, either or both of increasing flow rate and extending of the filtration cycle. Depending on the requirements of the specific separation process, diatomaceous earth may be used in multiple stages including, but not limited to, in a pre-coating stage and in a body feeding stage.

Some diatomaceous earth products may include small amounts of unwanted soluble metals e.g., iron, calcium, aluminum and copper, and/or other impurities. Thus, improved diatomaceous earth products may yield improved performance such as higher purity and/or higher permeability in filtration applications.

SUMMARY

In accordance with a first aspect, a filter aid may include an acid-washed diatomaceous earth having high purity, and perlite. In another aspect the filter aid may include an acid washed perlite. In yet another aspect, the filter aide may include both an acid washed diatomaceous earth and an acid washed perlite or an acid washed mixture of diatomaceous earth and perlite.

According to another aspect, a method of making a high purity filter aid may include acid washing diatomaceous earth to increase its purity, and combining the acid-washed diatomaceous earth with high purity perlite to obtain to obtain a high purity filter aid.

According to another aspect, a method of increasing the purity of a diatomaceous earth may include washing the diatomaceous earth in a first acid, rinsing the diatomaceous earth, and washing the diatomaceous earth in a second acid. The first acid may include an inorganic acid having a first strength, and the second acid may include an organic acid having a second strength different than the first strength.

According to still another aspect, a method of filtering a beverage may include passing the beverage through a filter including a filter aid. The filter aid may include acid-washed diatomaceous earth having high purity, and perlite.

In accordance with another aspect, a composite filter aid may include an acid-washed diatomaceous earth and a low extractable metal mineral.

According to another aspect, the filter aid may have a permeability in a range from 0.1 to 20 darcys, such as, for example, from 0.1 to 10 darcys, from 0.1 to 5 darcys, or from 0.1 to 3 darcys.

According to another aspect, the acid-washed diatomaceous earth may be obtained from a freshwater source or a saltwater source.

According to still another aspect, the low extractable metal mineral may include at least one of perlite, pumice, volcanic ash, kaolin, smectite, mica, talc, shirasu, obsidian, pitchstone, rice hull ash, or combinations thereof. The low extractable metal mineral may include perlite, such as, for example, an expanded perlite, an unexpanded perlite, a milled expanded perlite, or an acid-washed perlite.

According to another aspect, the acid-washed diatomaceous earth may include an acid-washed calcined diatomaceous earth or an acid-washed flux calcined diatomaceous earth.

It is to be understood that both the foregoing general description and the following detailed description are exemplary and explanatory only and are not restrictive of the invention, as claimed.

DESCRIPTION OF EXEMPLARY EMBODIMENTS

Figure 1:
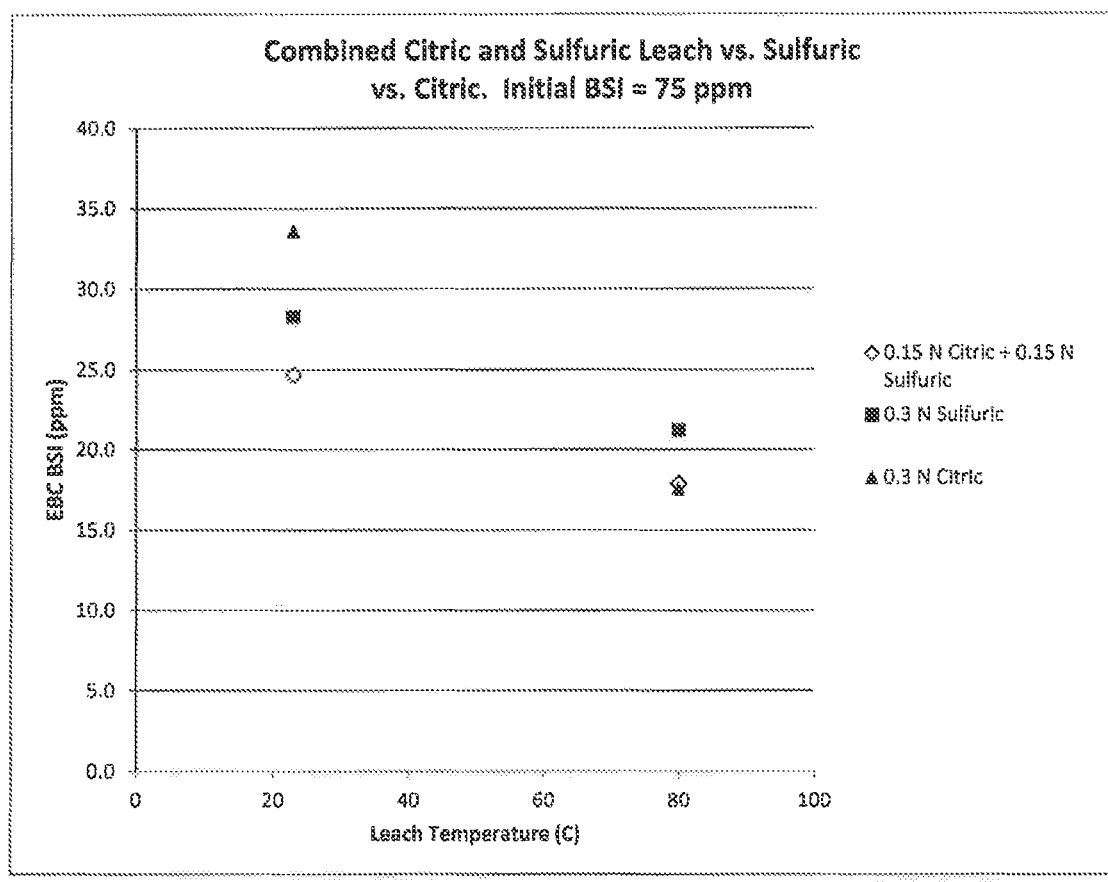
FIG. 1 is a graph showing EBC beer soluble iron for a diatomaceous earth sample as a function of temperature, single acids, and a mixture of organic and mineral acids.

According to some embodiments, a filter aid may include an acid-washed diatomaceous earth having high purity, and perlite. While not wishing to be bound by theory, it is believed that, surprisingly, acid washing the diatomaceous earth increases the purity by reducing trace amounts of extractable metals, and further, the perlite further increases the purity aid while substantially maintaining other desirable filtration characteristics of the filter aid.

According to some embodiments, the filter aid may have an EBC beer soluble iron (BSI) content of less than 30 ppm, as measured by the European Beverage Convention (EBC) method. For example, the filter aid may have an EBC BSI content of less than 25 ppm, less than 20 ppm, less than 15 ppm, or less than 10 ppm.

Any appropriate protocol or test for measuring levels of at least one soluble metal in composite materials may be used, including those now known to the skilled artisan or hereafter discovered. For example, the brewing industry has developed at least one protocol to measure the beer soluble iron (BSI) of composite material filter aids. BSI refers to the iron content, which may be measured in parts per million, of a filter aid including any material that dissociates in the presence of a liquid, such as beer. The European Beverage Convention (EBC) method contacts liquid potassium hydrogen phthalate with the filter aid and then analyzes the liquid for iron content. More specifically, the EBC method uses, for example, a 10 g/L solution of potassium hydrogen phthalate (KHP, $KHC_8H_4O_4$) as the extractant along with a given quantity of filter aid material, with a total contact time of two hours. Extracts are then analyzed for iron concentration by the FERROZINE method.

In addition to reduced extractable iron, the high purity diatomaceous earth can also display reduced content of other extractable metals. For example, in one aspect, the filter aid may have a very low FCC arsenic content of less than 0.5 ppm, as measured by the Food Chemical Codex (FCC) method of measuring metal solubility, which may be measured, for example, using a FISSON 1310+ ICP spectrometer. For example, the filter aid may have an FCC arsenic content of less than 0.3 ppm, less than 0.2 ppm, less than 0.1 ppm, or less than 0.05 ppm.

According to some embodiments, the filter aid (e.g., the diatomaceous earth component) has an acid-soluble arsenic content of less than 5 mg/kg, as measured by FCC. For example, the filter aid has an acid-soluble arsenic content of less than 2 mg/kg, less than 1 mg/kg, or less than 0.5 mg/kg, as measured by FCC.

According to some embodiments, the filter aid (e.g., the diatomaceous earth component) has an acid-soluble arsenic content of less than 10 ppm, as measured by FCC. For example, the filter aid has an acid-soluble arsenic content of less than 5 ppm, less than 2 ppm, less than 1 ppm, less than 0.5 ppm, or less than 0.2 ppm, as measured by FCC.

According to some embodiments, a ratio of diatomaceous earth to perlite of the filter aid may range from 1:99 to 99:1 by weight. For example, the ratio of diatomaceous earth to perlite may range from 10:90 to 5:95. According to some embodiments, the ratio of diatomaceous earth to perlite may range from 10:90 to 90:10 by weight, from 20:80 to 80:20 by weight, from 30:70 to 70:30 by weight, or from 40:60 to 60:40 by weight.

According to some embodiments, the diatomaceous earth may include un-calcined diatomaceous earth. According to some embodiments, the diatomaceous earth may include calcined diatomaceous earth. For example, the diatomaceous earth may include flash-calcined diatomaceous earth. The diatomaceous earth may be obtained from a freshwater source or a saltwater source.

According to some embodiments, the perlite may include expanded perlite. According to some embodiments, the perlite may include unexpanded perlite. According to some embodiments, the perlite may include milled expanded perlite. According to some embodiments, the perlite may include acid-washed perlite.

According to some embodiments, a method of making a high purity filter aid may include acid washing diatomaceous earth to increase the purity of the diatomaceous earth, and combining the acid-washed diatomaceous earth with high purity perlite to obtain a high purity filter aid. While not wishing to be bound by theory, it is believed that, surprisingly, acid washing the diatomaceous earth reduces the trace amounts extractable metal present in the diatomaceous earth, and further, combining the acid-washed diatomaceous earth with the high purity perlite further reduces the trace amounts of extractable metal present in the filter aid while substantially maintaining other desirable filtration characteristics of the filter aid.

According to some embodiments, acid washing the diatomaceous earth may include washing the diatomaceous earth in a first acid, and washing the diatomaceous earth, for example, previously washed in the first acid, in a second acid different than the first acid. According to some embodiments, the first acid may include an inorganic acid, and the second acid may include an organic acid. For example, the inorganic acid may be sulfuric acid ($H_2SO_4$), hydrochloric acid (HCl), phosphoric acid ($H_3PO_4$), and/or nitric acid ($HNO_3$). The organic acid may be, for example, citric acid ($C_6H_8O_7$) and/or acetic acid ($CH_3COOH$).

According to some embodiments, the first acid may have a first acid strength, and the second acid may have a second acid strength different than the first acid strength. According to some embodiments, the first acid strength may be greater than the second acid strength.

According to some embodiments of the method of making a high purity filter aid, the first acid strength may be 0.5 Normal or less. For example, the first acid strength may be 0.4 Normal or less, 0.3 Normal or less, 0.2 Normal or less, or 0.1 Normal or less. According to some embodiments, the second acid strength may be 0.3 Normal or less. For example, the acid strength may be 0.2 Normal or less, or 0.1 Normal or less. It has been surprisingly found that acid washing the diatomaceous earth in a relatively low strength acid (in comparison to higher strength acid concentrations, which might be expected to be more effective in reducing extractable metals) reduces the trace amounts of extractable metal present in the diatomaceous earth. It is believed lower acid concentrations lead to less etching of the DE surface which in effect "cleans" the surface of extractable metals without etching the surface thereby exposing "new surface area". Lower acid concentrations and temperatures can be beneficial because higher acid concentrations and temperatures lead to higher material costs and reduced life of processing equipment due to corrosion resulting from the higher strength acid.

According to some embodiments of the method of making a high purity filter aid, the acid washing may occur at a temperature of 60 degrees C. or less. For example, the acid washing may occur at a temperature of 50 degrees C. or less, at a temperature of 40 degrees C. or less, at a temperature of 30 degrees C. or less, or at a temperature of 20 degrees C. or less. For example, the acid washing may occur at a temperature ranging from 10 degrees C. to 60 degrees C. It has been surprisingly found that acid washing the diatomaceous earth at a relatively low temperature (in comparison to higher temperatures, which might be expected to be more effective in reducing extractable metals) reduces the trace amounts of extractable metal present in the diatomaceous earth. This may be beneficial because processing higher temperatures may often result in higher capital investment and/or processing costs.

According to some embodiments of the method of making a high purity filter aid, the resulting filter aid may have a very low FCC arsenic content of less than 0.5 ppm. For example, the filter aid may have an FCC arsenic content of less than 0.3 ppm, less than 0.2 ppm, less than 0.1 ppm, or less than 0.05 ppm. According to some embodiments, the filter aid (e.g., the diatomaceous earth component) has an acid-soluble arsenic content of less than 5 mg/kg, as measured by FCC. For example, the filter aid has an acid-soluble arsenic content of less than 2 mg/kg, less than 1 mg/kg, or less than 0.5 mg/kg, as measured by FCC.

According to some embodiments, the filter aid (e.g., the diatomaceous earth component) has an acid-soluble arsenic content of less than 10 ppm, as measured by FCC. For example, the filter aid has an acid-soluble arsenic content of less than 5 ppm, less than 2 ppm, less than 1 ppm, less than 0.5 ppm, or less than 0.2 ppm, as measured by FCC.

According to some embodiments of the method of making a high purity filter aid, the resulting filter aid may have an EBC BSI content of less than 30 ppm. For example, the filter aid may have an EBC BSI content of less than 25 ppm, less than 20 ppm, less than 15 ppm, or less than 10 ppm.

According to some embodiments of the method of making a high purity filter aid, a ratio of diatomaceous earth to perlite of the filter aid may range from 1:99 to 99:1 by weight. For example, the ratio of diatomaceous earth to perlite may range from 10:90 to 90:10. According to some embodiments, the ratio of diatomaceous earth to perlite may range from 10:90 to 90:10 by weight, from 20:80 to 80:20 by weight, from 30:70 to 70:30 by weight, or from 40:60 to 60:40 by weight.

According to some embodiments of the method of making a high purity filter aid, the diatomaceous earth may include un-calcined diatomaceous earth. According to some embodiments, the diatomaceous earth may include calcined diatomaceous earth. For example, the diatomaceous earth may include flash-calcined diatomaceous earth. The diatomaceous earth may be obtained from a freshwater source or a saltwater source.

According to some embodiments of the method of making a high purity filter aid, the perlite may include expanded perlite. According to some embodiments, the perlite may include unexpanded perlite. According to some embodiments, the perlite may include milled expanded perlite. According to some embodiments, the perlite may include acid-washed perlite.

According to some embodiments, a method of producing a high purity diatomaceous earth may include washing the diatomaceous earth in a first acid, rinsing the diatomaceous earth (e.g., the acid-washed diatomaceous earth), and washing the diatomaceous earth in a second acid. While not wishing to be bound by theory, it is believed that, surprisingly, acid washing the diatomaceous earth reduces the trace amounts of extractable metal present in the diatomaceous earth. According to some embodiments, the first acid may include an inorganic acid having a first strength, and the second acid may include an organic acid having a second strength different than the first strength. While not wishing to be bound by theory, it is believed that, surprisingly, acid washing the diatomaceous earth twice with a first, relatively stronger acid and thereafter with an second relatively weaker acid, reduces the trace amounts of extractable metal present in the diatomaceous earth.

According to some embodiments of the method of increasing the purity of a diatomaceous earth, the first acid strength may be 0.5 Normal or less. For example, the first acid strength may be 0.4 Normal or less, 0.3 Normal or less, 0.2 Normal or less, or 0.1 Normal or less. According to some embodiments, the second acid strength may be 0.3 Normal or less, 0.2 Normal or less, or 0.1 Normal or less. It has been surprisingly found that acid washing the diatomaceous earth in a relatively low strength acid (in comparison to higher strength acid concentrations, which might be expected to be more effective in reducing extractable metals) reduces the trace amounts of extractable metal present in the diatomaceous earth.

According to some embodiments of the method of increasing the purity of a diatomaceous earth, at least one of the washing the diatomaceous earth in the first acid and the washing the diatomaceous earth in the second acid may occur at a temperature of 60 degrees C. or less. It has been surprisingly found that acid washing the diatomaceous earth at a relatively low temperature (in comparison to higher temperatures, which might be expected to be more effective in reducing extractable metals) reduces the trace amounts of extractable metal present in the diatomaceous earth. According to some embodiments of the method of reducing extractable metals from diatomaceous earth, at least one of the washing the diatomaceous earth in the first acid and the washing the diatomaceous earth in the second acid may occur at a temperature of 50 degrees C. or less. For example, at least one of the washing the diatomaceous earth in the first acid and the washing the diatomaceous earth in the second acid may occur at a temperature of 40 degrees C. or less, at a temperature of 30 degrees C. or less, or at a temperature of 20 degrees C. or less.

According to some embodiments, a method of filtering a beverage may include passing the beverage through a filter including a filter aid, wherein the filter aid includes acid-washed diatomaceous earth having high purity, and perlite. According to some embodiments, the method may further includes, for example, prior to passing the beverage through the filter, pre-coating a filter structure with the filter aid. According to some embodiments, passing the beverage through the filter may include adding the filter aid as a body feed in the beverage. According to some embodiments, the beverage may include at least one of fruit juice and wine. According to some embodiments, the beverage may include beer or water.

According to some embodiments, the filter aid may have a permeability in a range from 0.01 to 20 darcys, such as, for example, from 0.05 to 10 darcys, from 0.1 to 5 darcys, or from 0.1 to 3 darcys.

The diatomaceous earth, perlite, and/or filter aid composition, may be characterized by particle size. Particle size may be measured by any appropriate measurement technique now known to the skilled artisan or hereafter discovered. In one exemplary method, particle size and particle size properties, such as particle size distribution ("psd"), are measured using a Leeds and Northrup Microtrac X100 laser particle size analyzer (Leeds and Northrup, North Wales, Pa., USA), which can determine particle size distribution over a particle size range from 0.12 µm to 704 µm. The size of a given particle is expressed in terms of the diameter of a sphere of equivalent diameter that sediments through the suspension, also known as an equivalent spherical diameter or "esd." The median particle size, or $d_{50}$ value, is the value at which 50% by weight of the particles have an esd less than that $d_{50}$ value. The $d_{10}$ value is the value at which 10% by weight of the particles have an esd less than that $d_{10}$ value. The $d_{90}$ value is the value at which 90% by weight of the particles have an esd less than that $d_{90}$ value.

According to some embodiments, the filter aid may have a $d_{10}$ in a range from 5 to 30 microns. According to some embodiments, the filter aid may have a $d_{50}$ in a range from 15 to 70 microns. According to some embodiments, the filter aid may have a $d_{90}$ in a range from 50 to 200 microns.

According to some embodiments, the acid-washed diatomaceous earth may have a $d_{10}$ in a range from 3 to 15 microns. According to some embodiments, the acid-washed diatomaceous earth may have a dso in a range from 10 to 70 microns. According to some embodiments, the acid-washed diatomaceous earth may have a $d_{90}$ in a range from 30 to 130 microns.

According to some embodiments, the perlite may have a $d_{10}$ in a range from 3 to 30 microns. According to some embodiments, the perlite may have a $d_{50}$ in a range from 10 to 80 microns. According to some embodiments, the perlite may have a $d_{90}$ in a range from 30 to 150 microns.

The filter aids disclosed herein may be characterized by BET surface area. BET surface area, as used herein, refers to the technique for calculating specific surface area of physical absorption molecules according to Brunauer, Emmett, and Teller ("BET") theory. BET surface area may be measured by any appropriate measurement technique now known to the skilled artisan or hereafter discovered. In one exemplary method, BET surface area is measured with a Gemini III 2375 Surface Area Analyzer, using pure nitrogen as the sorbent gas, from Micromeritics Instrument Corporation (Norcross, Ga., USA). In some embodiments, the BET surface area of the filter aid is greater than for an material not produced according to embodiments described herein.

According to some embodiments, the filter aid may have a BET surface area in a range from 1 $m^2/g$ to 50 $m^2/g$. According to some embodiments, the BET surface area of the filter aid may be in a range from about 3 $m^2/g$ to about 30 $m^2/g$. Without wishing to be bound by a particular theory, acid-washing may increase the surface area of the diatomaceous earth and/or perlite but preferably only minimally According to some embodiments, the filter aid may have a median pore size in a range from 1 to 35 microns. For example, the filter aid may have a median pore size in a range from 1 to 20 microns, from 1 to 10 microns, from 3 to 10 microns, or from 3 to 5 microns.

According to some embodiments, the pore volume of the composite filter aid may range from 2 to 7 mL/g.

According to some embodiments, the filter aid may have a beer soluble iron content of less than 50 ppm, as measured by EBC. For example, the filter aid may have a beer soluble iron content of less than 40 ppm, less than 30 ppm, less than 20 ppm, or less than 10 ppm, as measured by EBC.

According to some embodiments, the filter aid (e.g., the diatomaceous earth component) has an acid-soluble iron content of less than 100 mg/kg, as measured by FCC method. For example, the filter aid has an acid-soluble iron content of less than 50 mg/kg, less than 40 mg/kg, or less than 30 mg/kg, as measured by FCC.

According to some embodiments, the filter aid (e.g., the diatomaceous earth component) has an acid-soluble iron content of less than 100 parts per million (ppm), as measured by FCC method. For example, the filter aid has an acid-soluble iron content of less than 70 ppm, less than 50 ppm, less than 40 ppm, less than 30 ppm, less than 20 ppm, or less than 10 ppm, as measured by FCC.

According to some embodiments, the filter aid may have a beer soluble calcium content of less than 200 ppm, as measured by EBC. For example, the filter aid may have a beer soluble calcium content of less than 150 ppm, less than 100 ppm, less than 50 ppm, less than 30 ppm, or less than 15 ppm, as measured by EBC.

According to some embodiments, the filter aid (e.g., the diatomaceous earth component) has an acid-soluble calcium content of less than 200 mg/kg, as measured by FCC. For example, the filter aid has an acid-soluble calcium content of less than 150 mg/kg, less than 100 mg/kg, less than 50 mg/kg, or less than 30 mg/kg, as measured by FCC.

According to some embodiments, the composite filter aid (e.g., the diatomaceous earth component) has an acid-soluble calcium content of less than 200 ppm, as measured by FCC. For example, the filter aid has an acid-soluble calcium content of less than 150 ppm, less than 100 ppm, less than 50 ppm, or less than 30 ppm, as measured by FCC.

According to some embodiments, the filter aid may have a beer soluble aluminum content of less than 30 ppm, as measured by EBC. For example, the filter aid may have a beer soluble aluminum content of less than 20 ppm, less than 15 ppm, or less than 10 ppm, as measured by EBC.

According to some embodiments, the filter aid (e.g., the diatomaceous earth component) has an acid-soluble aluminum content of less than 280 mg/kg, as measured by FCC. For example, the filter aid has an acid-soluble aluminum content of less than 200 mg/kg, less than 100 mg/kg, or less than 80 mg/kg, as measured by FCC.

According to some embodiments, the filter aid (e.g., the diatomaceous earth component) has an acid-soluble aluminum content of less than 280 ppm, as measured by FCC. For example, the filter aid has an acid-soluble aluminum content of less than 200 ppm, less than 100 ppm, less than 80 ppm, less than 50 ppm, less than 30 ppm, less than 20 ppm, less than 15 ppm, or less than 10 ppm, as measured by FCC.

According to some embodiments, the filter aid may have a very low beer soluble arsenic content of less than 5 ppm, as measured by EBC. For example, the filter aid may have a beer soluble arsenic content of less than 2 ppm, less than 1 ppm, less than 0.5 ppm; or less than 0.2 ppm, as measured by EBC.

According to some embodiments, the filter aid may have a very low acid-soluble arsenic content of less than 5 mg/kg, as measured by FCC. For example, the filter aid may have an acid-soluble arsenic content of less than 2 mg/kg, less than 1 mg/kg, or less than 0.5 mg/kg, as measured by FCC.

According to some embodiments, the filter aid (e.g., the diatomaceous earth component) may have a very low acid-soluble arsenic content of less than 10 ppm, as measured by FCC. For example, the filter aid has an acid-soluble arsenic content of less than 5 ppm, less than 2 ppm, less than 1 ppm, less than 0.5 ppm, or less than 0.2 ppm, as measured by FCC.

According to some embodiments, the filter aid may have an acid-soluble copper content of less than 5 mg/kg, as measured by FCC. For example, the filter aid may have an acid-soluble copper content of less than 2 mg/kg, less than 1.5 mg/kg, or less than 1 mg/kg, as measured by FCC.

According to some embodiments, the filter aid may have an acid-soluble lead content of less than 1 mg/kg, as measured by FCC. For example, the filter aid may have an acid-soluble lead content of less than 0.5 mg/kg, less than 0.2 mg/kg, or less than 0.1 mg/kg, as measured by FCC.

According to some embodiments, the filter aid may have a cristobalite content of less than 20% by weight. For example, the filter aid may have a cristobalite content of less than 10% by weight, less than 6% by weight, or less than 1% by weight.

According to some embodiments, the filter aid may have a wet density in a range from 5 to 30 lbs/ft$^3$, such as, for example, from 15 to 25 lbs/ft$^3$. According to some embodiments, the filter aid may have a wet density less than or equal to 25 lbs/ft$^3$, less than or equal to 15 lbs/ft$^3$, or less than or equal to 10 lbs/ft$^3$.

Diatomaceous Earth

Diatomaceous earth products may be obtained from diatomaceous earth (also called "DE" or "diatomite"), which is generally known as a sediment-enriched in biogenic silica (i.e., silica produced or brought about by living organisms) in the form of siliceous skeletons (frustules) of diatoms. Diatoms are a diverse array of microscopic, single-celled, golden-brown algae generally of the class Bacillariophyceae that possess an ornate siliceous skeleton of varied and intricate structures including two valves that, in the living diatom, fit together much like a pill box.

Diatomaceous earth may form from the remains of waterborne diatoms and, therefore, diatomaceous earth deposits may be found close to either current or former bodies of water. Those deposits are generally divided into two categories based on source: freshwater and saltwater. Freshwater diatomaceous earth is generally mined from dry lakebeds and may be characterized as having a low crystalline silica content and a high iron content. In contrast, saltwater diatomaceous earth is generally extracted from oceanic areas and may be characterized as having a high crystalline silica content and a low iron content.

Processes for preparing the diatomaceous earth products may include at least one natural diatomaceous earth as a starting material. For example, the term "natural diatomaceous earth" includes any diatomaceous earth material that has not been subjected to thermal treatment (e.g., calcination) sufficient to induce formation of greater than 1% cristobalite. "Natural diatomaceous earth" may also include diatomaceous earth including un-calcined diatomaceous earth. In some embodiments, the diatomaceous earth may be obtained from a saltwater source. In some embodiments, the diatomaceous earth may be obtained from a freshwater source. In further embodiments, the diatomaceous earth is any diatomaceous earth material that may be capable of use in composite material such as a composite filter aid, either in its natural form or after subjecting the material to one or more processing steps. In some embodiments, the diatomaceous earth is any diatomaceous earth material that has not been subjected to at least one thermal treatment. In still other embodiments, the diatomaceous earth is any diatomaceous earth material that has not been subjected to calcination. The average particle size for the diatomaceous earth may be in a range from 3 to 200 microns. The BET surface area of the diatomaceous earth may be in a range from 1 to 50 m$^2$/g. The pore volume of the diatomaceous earth may range from 1 to 10 mL/g with median pore size ranging from 1 to 20 microns.

As stated earlier, diatomaceous earth is, in general, a sedimentary biogenic silica deposit including the fossilized skeletons of diatoms, one-celled algae-like plants that accumulate in marine or fresh water environments. Honeycomb silica structures generally give diatomaceous earth useful characteristics such as absorptive capacity and surface area, chemical stability, and low-bulk density. In some embodiments, diatomaceous earth includes about 90% SiO$_2$ mixed with other substances. In some embodiments, diatomaceous earth includes about 90% SiO$_2$, plus various metal oxides, such as, but not limited to, aluminum, iron, calcium, and magnesium oxides.

Diatomaceous earth may have any of various appropriate forms now known to the skilled artisan or hereafter discovered. In some embodiments, the diatomaceous earth may undergo one or more of a milling, drying, or air classifying process Low Extractable Metal Mineral The low extractable metal mineral may include a mineral material having a low extractable metal content. For example, the low extractable metal mineral may include one or more of perlite, pumice, volcanic ash, kaolin, smectite, mica, talc, shirasu, obsidian, pitchstone, and rice hull ash.

According to some embodiments, the low extractable metal mineral may include a "natural glass" or "volcanic glass." Several types of natural glasses include, for example, perlite, pumice, pumicite, shirasu, obsidian, pitchstone, and volcanic ash. Prior to processing, perlite may be gray to green in color with abundant spherical cracks that cause it to break into small pearl-like masses. Pumice is a lightweight glassy vesicular rock. Obsidian may be dark in color with a vitreous luster and a characteristic conchoidal fracture. Pitchstone has a waxy resinous luster and may be brown, green, or gray. Volcanic ash, sometimes referred to as "tuff" when in consolidated form, includes small particles or fragments that may be in glassy form. According to some embodiments, the low extractable metal mineral may be chemically equivalent to rhyolite, trachyte, dacite, andesite, latite, or basalt.

The term "obsidian" is generally applied to large numbers of natural glasses that are rich in silica. Obsidian glasses may be classified into subcategories according to their silica content, with rhyolitic obsidians (containing typically about 73% $SiO_2$ by weight) being the most common.

Perlite is a hydrated material that may contain, for example, about 72 to about 75% $SiO_2$, about 12 to about 14% $Al_2O_3$, about 0.5 to about 2% $Fe_2O_3$, about 3 to about 5% $Na_2O$, about 4 to about 5% $K_2O$, about 0.4 to about 1.5% CaO (by weight), and small amounts of other metallic elements. In some embodiments, perlite may be distinguished by a relatively higher content (such as about 2 to about 5% by weight) of chemically-bonded water, the presence of a vitreous, pearly luster, and characteristic concentric or arcuate onion skin-like (i.e., perlitic) fractures.

Perlite products may be prepared by milling and thermal expansion, and may possess unique physical properties such as high porosity, low bulk density, and chemical inertness. Average particle size for the milled expanded perlite may be in a range from 3 to 200 microns. Pore volume for milled expanded perlite may be in a range from 1 to 10 mL/g with median pore size from 1 to 20 microns. According to some embodiments, the perlite may include high purity perlite. According to some embodiments, the perlite may include expanded perlite. According to some embodiments, the perlite may include unexpanded perlite. According to some embodiments, the perlite may include milled expanded perlite.

Acid Washing

The diatomaceous earth may be acid-washed as set forth above. The acid washing may include washing the diatomaceous earth with at least one acid. The at least one acid may include an inorganic acid, such as, for example, sulfuric acid ($H_2SO_4$), hydrochloric acid (HCl), phosphoric acid ($H_3PO_4$), and nitric acid ($HNO_3$). The at least one acid may include an organic acid, such as, for example, citric acid ($C_6H_8O_7$) or acetic acid ($CH_3COOH$). As used in this disclosure, the acid washing may also be referred to as "acid leaching" or "acid extracting." Without wishing to be bound by a particular theory, it is believed that the acid washing step extracts or leaches metal-containing compounds from the diatomaceous earth, thereby increasing the relative amount of silica ($SiO_2$) or other non-metallic components in the diatomaceous earth.

According to some embodiments, the acid washing (e.g., the first and/or second acid washing) may be performed using an acid solution having an acid strength in a range from about 0.1 M to about 2 M, such as, for example, in a range from about 0.1 M to about 1 M, from about 1 M to about 2 M, from about 0.5 M to about 1 M, or from about 0.5 M to about 2 M. According to some embodiments, the solid content in the acid solution may range from about 5% to about 20%, such as, for example, from about 5% to about 15%, about 5% to about 10%, from about 10% to about 20%, or from about 15% to about 20%.

According to some embodiments, the acid washing (e.g., the first and/or second acid washing) may occur at a temperature in a range from about ambient room temperature (about 20 degrees C.) to about 100 degrees C., such as, for example from about 20 degrees C. to about 700 degrees C., or from about 20 degrees C. to about 50 degrees C. According to some embodiments, the acid washing (e.g., the first and/or second acid washing) may be carried out for a time or duration in a range from about 10 minutes to about 120 minutes, such as, for example, from about 20 minutes to about 60 minutes, from about 30 minutes to about 60 minutes, from about 30 minutes to about 120 minutes, or from about 60 minutes to about 120 minutes. According to some embodiments, the acid washing may include rinsing the acid from the diatomaceous earth, for example, before the first acid washing, between the first and second acid washing, and/or after the second acid washing. The rinsing step may include, for example, more than one rinse with water, such as 1 to 3 rinses with water. According to some embodiments, the rinsing may be sufficient to increase the pH of the diatomaceous earth to a pH of at least about 5.0, such as, for example, at least about 5.5, at least about 6.0, at least about 6.5, or at least about 7.0. According to some embodiments, the rinses may be done at an elevated temperature (relative to ambient), such as, for example, at a temperature of at least about 30 degrees C., at least about 40 degrees C., or at least about 50 degrees C.

According to some embodiments, a thermal processing, such as, for example, a calcining, may be carried out prior to the acid washing. According to some embodiments, the acid washing may occur prior to the thermal processing. According to some embodiments, the calcining may include flux-calcining the diatomaceous earth and/or perlite. According to some embodiments, the acid-washed diatomaceous earth may include less than or equal to about 100 mg/kg acid-soluble iron, such as, for example, less than or equal to about 70 mg/kg acid-soluble iron, less than or equal to about 50 mg/kg acid-soluble iron, less than or equal to about 40 mg/kg acid-soluble iron, less than or equal to about 30 mg/kg acid-soluble iron, less than or equal to about 20 mg/kg acid-soluble iron, less than or equal to about 15 mg/kg acid-soluble iron, less than or equal to about 10 mg/kg acid-soluble iron, less than or equal to about 5 mg/kg acid-soluble iron, or less than or equal to about 3 mg/kg acid-soluble iron.

According to some embodiments, the acid-washed diatomaceous earth may have an acid-soluble iron content of less than 100 parts ppm, as measured by FCC method. For example, the acid-washed diatomaceous earth has an acid-soluble iron content of less than 70 ppm, less than 50 ppm, less than 40 ppm, less than 30 ppm, less than 20 ppm, or less than 10 ppm, as measured by FCC.

According to some embodiments, the acid-washed diatomaceous earth may include less than or equal to about 1 mg/kg acid-soluble lead. For example, the diatomaceous earth may include less than or equal to about 0.8 mg/kg acid-soluble lead, less than or equal to about 0.7 mg/kg acid-soluble lead, less than or equal to about 0.6 mg/kg acid-soluble lead, less than or equal to about 0.5 mg/kg acid-soluble lead, less than or equal to about 0.4 mg/kg acid-soluble lead, less than or equal to about 0.3 mg/kg acid-soluble lead, less than or equal to about 0.2 mg/kg acid-soluble lead, or less than or equal to about 0.1 mg/kg acid-soluble lead. According to some embodiments, the acid-soluble lead may be at or below the detection limit of the instrument, which may generally be less than 0.1 mg/kg acid-soluble lead or 0.0 mg/kg acid-soluble lead.

According to some embodiments, the acid-washed diatomaceous earth may include less than or equal to about 100 mg/kg acid-soluble aluminum. For example, the diatomaceous earth may include less than or equal to about 70 mg/kg acid-soluble aluminum, less than or equal to about 60 mg/kg acid-soluble aluminum, less than or equal to about 50 mg/kg acid-soluble aluminum, less than or equal to about 40 mg/kg acid-soluble aluminum, less than or equal to about 30 mg/kg acid-soluble aluminum, less than or equal to about 20 mg/kg acid-soluble aluminum, less than or equal to about 15 mg/kg acid-soluble aluminum, less than or equal to about 10 mg/kg acid-soluble aluminum, less than or equal to about 5 mg/kg acid-soluble aluminum, or less than or equal to about 3 mg/kg acid-soluble aluminum.

According to some embodiments, the acid-washed diatomaceous earth may include an acid-soluble aluminum content of less than 280 ppm, as measured by FCC. For example, the acid-washed diatomaceous earth has an acid-soluble aluminum content of less than 200 ppm, less than 100 ppm, less than 80 ppm, less than 50 ppm, less than 30 ppm, less than 20 ppm, less than 15 ppm, or less than 10 ppm, as measured by FCC.

According to some embodiments, the acid-washed diatomaceous earth may include less than or equal to about 800 mg/kg acid-soluble calcium, such as, for example, less than or equal to about 500 mg/kg acid-soluble calcium, less than or equal to about 400 mg/kg acid-soluble calcium, less than or equal to about 300 mg/kg acid-soluble calcium, less than or equal to about 200 mg/kg acid-soluble calcium, less than or equal to about 150 mg/kg acid-soluble calcium, less than or equal to about 100 mg/kg acid-soluble calcium, less than or equal to about 75 mg/kg acid-soluble calcium, or less than or equal to about 50 mg/kg acid-soluble calcium.

According to some embodiments, the acid-washed diatomaceous earth may include an acid-soluble calcium content of less than 200 ppm, as measured by FCC. For example, the acid-washed diatomaceous earth has an acid-soluble calcium content of less than 150 ppm, less than 100 ppm, less than 50 ppm, or less than 30 ppm, as measured by FCC.

According to some embodiments, the acid-washed diatomaceous earth may include less than or equal to about 10 mg/kg acid-soluble arsenic, less than or equal to about 5 mg/kg acid-soluble arsenic, less than or equal to about 1 mg/kg acid-soluble arsenic, such as, for example, less than or equal to about 0.8 mg/kg acid-soluble arsenic, less than or equal to about 0.7 mg/kg acid-soluble arsenic, less than or equal to about 0.6 mg/kg acid-soluble arsenic, less than or equal to about 0.5 mg/kg acid-soluble arsenic, less than or equal to about 0.4 mg/kg acid-soluble arsenic, less than or equal to about 0.3 mg/kg acid-soluble arsenic, less than or equal to about 0.2 mg/kg acid-soluble arsenic, or less than or equal to about 0.1 mg/kg acid-soluble arsenic. According to some embodiments, the acid-soluble arsenic may be at or below the detection limit of the instrument, which may generally be less than 0.1 mg/kg acid-soluble arsenic or 0.0 mg/kg acid-soluble arsenic.

According to some embodiments, the acid-washed diatomaceous earth may include an acid-soluble arsenic content of less than 10 ppm, as measured by FCC. For example, the acid-washed diatomaceous earth has an acid-soluble arsenic content of less than 5 ppm, less than 2 ppm, less than 1 ppm, less than 0.5 ppm, or less than 0.2 ppm, as measured by FCC.

Classification

The diatomaceous earth and/or the perlite (e.g., high purity perlite) may be subjected to at least one classification step. For example, the particle size of the diatomaceous earth material and/or perlite may be adjusted to a suitable or desired size using any one of several techniques well known in the art. In some embodiments, the diatomaceous earth material and/or perlite may be subjected to at least one mechanical separation to adjust the powder size distribution. Appropriate mechanical separation techniques may include, but are not limited to, milling, grinding, screening, extrusion, triboelectric separation, liquid classification, aging, and air classification.

Heat Treatment

The diatomaceous earth and/or perlite may be subjected to at least one heat treatment. In some embodiments, the at least one heat treatment decreases the amount of organics and/or volatiles in the heat-treated diatomaceous earth and/or perlite. In some embodiments, the at least one heat treatment may include at least one calcination. In some embodiments, the at least one heat treatment may include at least one flux calcination. In some embodiments, the at least one heat treatment may include at least one roasting. A heat treatment may occur prior to acid washing of the diatomaceous earth.

Calcination may be conducted according to any appropriate process. In some embodiments, calcination may be conducted at temperatures below the melting point of the diatomaceous earth and/or perlite. In some embodiments, calcination may be conducted at a temperature ranging from about 600 degrees C. to about 1100 degrees C. In some embodiments, the calcination temperature ranges from about 600 degrees C. to about 700 degrees C. In some embodiments, the calcination temperature ranges from about 700 degrees C. to about 800 degrees C. In some embodiments, the calcination temperature ranges from about 800 degrees C. to about 900 degrees C. In some embodiments, the calcination temperature may be chosen from the group consisting of about 600 degrees C., about 700 degrees C., about 800 degrees C., about 900 degrees C., about 1000 degrees C., and about 1100 degrees C. Heat treatment at a lower temperature may result in an energy savings over other processes for the preparation of diatomaceous earth and/or perlite.

Flux calcination includes conducting at least one calcination in the presence of at least one fluxing agent. In some embodiments, the at least one fluxing agent may be a salt including at least one alkali metal. In some embodiments, the at least one fluxing agent may be chosen from the group consisting of carbonate, silicate, chloride, and hydroxide salts. In other embodiments, the at least one fluxing agent may be chosen from the group consisting of sodium, potassium, rubidium, and cesium salts. In still further embodiments, the at least one fluxing agent may be chosen from the group consisting of sodium, potassium, rubidium, and cesium carbonate salts. According to some embodiments, residual metal content from a fluxing agent may be removed by acid washing.

In some embodiments, roasting is a calcination process conducted at a generally lower temperature that may help avoid formation of crystalline silica in the diatomaceous earth and/or perlite. In some embodiments, roasting may be conducted at a temperature in a range from about 450 degrees C. to about 900 degrees C. In some embodiments, the roasting temperature may be in a range from about 500 degrees C. to about 800 degrees C. In some embodiments, the roasting temperature may be in a range from about 600 degrees C. to about 700 degrees C. In some embodiments, the roasting temperature may be in a range from about 700 degrees C. to about 900 degrees C. In some embodiments, the roasting temperature is chosen from the group consisting of about 450 degrees C., about 500 degrees C., about 600 degrees C., about 700 degrees C., about 800 degrees C., and about 900 degrees C.

The filter aids disclosed herein, according to some embodiments, may have a permeability suitable for use in filters. Permeability may be measured by any appropriate measurement technique now known to the skilled artisan or hereafter discovered. Permeability may be measured in darcy units or darcies, as determined by the permeability of a porous bed 1 centimeter high and with a 1 square centimeter section through which flows a fluid with a viscosity of one mPa·s with a flow rate of one cm³/sec under an applied pressure differential of one atmosphere. The principles for measuring permeability have been previously derived for porous media from Darcy's law (see, for example, J. Bear, "The Equation of Motion of a Homogeneous Fluid: Derivations of Darcy's Law," in *Dynamics of Fluids in Porous Media* 161-177 (2nd ed. 1988)). An array of devices and methods are in existence that may correlate with permeability. In one exemplary method useful for measuring permeability, a specially constructed device is designed to form a filter cake on a septum from a suspension of filtration media in water, and the time required for a specified volume of water to flow through a measured thickness of filter cake of known cross-sectional area is measured.

In some embodiments, the filter aid has a permeability in a range from about 0.5 darcys to about 20 darcys. In some embodiments, the filter aid has a permeability in a range from about 0.5 darcys to about 10 darcys. In some embodiments, the filter aid has a permeability in a range from about 0.5 darcys to about 5 darcys. In some embodiments, the permeability may be in a range from about 0.5 darcys to about 2 darcys. In some embodiments, the permeability may be in a range from about 1 darcy to about 2 darcys.

In some embodiments, the $d_{10}$ of the filter aid composition is in a range from about 5 µm to about 30 µm. In some embodiments, the $d_{10}$ is in a range from about 10 µm to about 30 µm. In some embodiments, the $d_{10}$ is in a range from about 15 µm to about 30 µm. In some embodiments, the $d_{10}$ is in a range from about 20 µm to about 30 µm.

In some embodiments, the $d_{50}$ of the filter aid composition is in a range from about 15 µm to about 80 µm. In some embodiments, the $d_{50}$ is in a range from about 20 µm to about 80 µm. In some embodiments, the $d_{50}$ is in a range from about 30 µm to about 80 µm. In some embodiments, the $d_{50}$ is in a range from about 40 µm to about 80 µm. In some embodiments, the dso is in a range from about 50 µm to about 80 µm. In some embodiments, the dso is in a range from about 60 µm to about 80 µm.

In some embodiments, the $d_{90}$ of the filter aid composition is in a range from about 50 µm to about 200 µm. In some embodiments, the $d_{90}$ is in a range from about 60 µm to about 200 µm. In some embodiments, the $d_{90}$ is in a range from about 70 µm to about 200 µm. In some embodiments, the $d_{90}$ is in a range from about 80 µm to about 200 µm. In some embodiments, the $d_{90}$ is in a range from about 90 µm to about 200 µm. In some embodiments, the $d_{90}$ is in a range from about 100 µm to about 200 µm. In some embodiments, the $d_{90}$ is in a range from about 110 µm to about 200 µm. In some embodiments, the $d_{90}$ is in a range from about 120 µm to about 200 µm. In some embodiments, the $d_{90}$ is in a range from about 150 µm to about 200 µm.

The filter aid compositions disclosed herein may have a low crystalline silica content. Forms of crystalline silica include, but are not limited to, quartz, cristobalite, and tridymite. In some embodiments, the filter aid may have a lower content of at least one crystalline silica than a filter aid not including diatomaceous earth not subjected to at least one acid washing.

Cristobalite content may be measured by any appropriate measurement technique now known to the skilled artisan or hereafter discovered. In one exemplary method, cristobalite content is measured by x-ray diffraction. Cristobalite content may be measured, for example, by the quantitative X-ray diffraction method outlined in H. P. Klug and L. E. Alexander, *X-Ray Diffraction Procedures for Polycrystalline and Amorphous Materials* 531-563 (2nd ed. 1972), which is incorporated by reference herein in its entirety. According to one example of that method, a sample is milled in a mortar and pestle to a fine powder, then back-loaded into a sample holder. The sample and its holder are placed into the beam path of an X-ray diffraction system and exposed to collimated X-rays using an accelerating voltage of 40 kV and a current of 20 mA focused on a copper target. Diffraction data are acquired by step-scanning over the angular region representing the interplanar spacing within the crystalline lattice structure of cristobalite, yielding the greatest diffracted intensity. That region ranges from 21 to 23 2θ (2-theta), with data collected in 0.05 2θ steps, counted for 20 seconds per step. The net integrated peak intensity is compared with those of standards of cristobalite prepared by the standard additions method in amorphous silica to determine the weight percent of the cristobalite phase in a sample.

In some embodiments of the filter aid, the cristobalite content is less than about 20% by weight. In some embodiments, the cristobalite content is less than about 10% by weight. In some embodiments, the cristobalite content is less than about 6% by weight. In some embodiments, the cristobalite content is less than about 1% by weight.

Filter aids disclosed herein may have a low quartz content. Quartz content may be measured by any appropriate measurement technique now known to the skilled artisan or hereafter discovered. In one exemplary method, quartz content is measured by x-ray diffraction. For example, quartz content may be measured by the same x-ray diffraction method described above for cristobalite content, except the that 2θ region ranges from 26.0 to 27.5 degrees. In some embodiments, the quartz content of the filter aid is less than about 0.5%. In some embodiments, the quartz content is less than about 0.25%. In some embodiments, the quartz content is less than about 0.1%. In some embodiments, the quartz content is about 0%. In some embodiments, the quartz content may be in a range from about 0% to about 0.5%. In some embodiments, the quartz content may be in a range from about 0% to about 0.25%.

The filter aids disclosed herein may be characterized by measurable pore volume. Pore volume may be measured by any appropriate measurement technique now known to the skilled artisan or hereafter discovered. In one exemplary method, pore volume is measured with an AutoPore IV 9500 series mercury porosimeter from Micromeritics Instrument Corporation (Norcross, Ga., USA), which can determine measure pore diameters in a range from 0.006 to 600 µm. As used to measure the pore volume of the composite materials disclosed herein, that porosimeter's contact angle was set at 130 degrees, and the pressure ranged from 0 to 33,000 psi. In some embodiments, the pore volume of the filter aid composition is about equal to the diatomaceous earth and/or perlite from which it is made. In some embodiments, the pore volume may be in a range from about 1 mL/g to about 10 mL/g. In some embodiments, the pore volume may be in a range from about 4 mL/g to about 8 mL/g. In some embodiments, the pore volume may be in a range from about 4 mug to about 6 mL/g. In some embodiments, the pore volume is about 5 mL/g.

The filter aids disclosed herein may be characterized by median pore size. Median pore size may be measured by any appropriate measurement technique now known to the skilled artisan or hereafter discovered. In one exemplary method, median pore size is measured with an AutoPore IV 9500 series mercury porosimeter, as described above. In some embodiments, the median pore size is in a range from about 1 µm to about 10 µm. In some embodiments, the median pore size is in a range from about 2 µm to about 7 µm. In some embodiments, the median pore size is in a range from about 2 µm to about 5 µm.

The filter aids disclosed herein may be characterized by wet density, which, as used herein, refers to measurement of centrifuged wet density. According to one exemplary method, to measure wet density, a filter aid sample of known weight from about 1.00 to about 2.00 g is placed in a calibrated 15 ml centrifuge tube to which deionized water is added to make up a volume of approximately 10 ml. The mixture is shaken thoroughly until all of the sample is wetted, and no powder remains. Additional deionized water is added around the top of the centrifuge tube to rinse down any mixture adhering to the side of the tube from shaking. The tube is centrifuged for 5 minutes at 2500 rpm on an IEC Centra® MP-4R centrifuge, equipped with a Model 221 swinging bucket rotor (International Equipment Company; Needham Heights, Mass., USA). Following centrifugation, the tube is carefully removed without disturbing the solids, and the level (i.e., volume) of the settled matter is measured in $cm^3$. The centrifuged wet density of powder is readily calculated by dividing the sample weight by the measured volume. In some embodiments, the wet density of the filter aid is in a range from about 10 $lbs/ft^3$ to about 20 $lbs/ft^3$. In some embodiments, the wet density is in a range from about 10 $lbs/ft^3$ to about 16 $lbs/ft^3$ or about 12 $lbs/ft^3$ to about 15 $lbs/ft^3$.

According to some embodiments, the filter aid may include at least one additional filter aid medium. Examples of suitable additional filter aid media include, but are not limited to, natural or synthetic silicate or aluminosilicate materials, unimproved diatomaceous earth, saltwater diatomaceous earth, pumicite, natural glass, cellulose, activated charcoal, feldspars, nepheline syenite, sepiolite, zeolite, and clay.

The at least one additional filter medium may be present in any appropriate amount. For example, the at least one additional filter medium may be present from about 0.01 to about 100 parts of at least one additional filter medium per part of the filter aid. In some embodiments, the at least one additional filter medium may be present from about 0.1 to about 10 parts. In some embodiments, the at least one additional filter medium may be present from about 0.5 to 5 parts.

According to some embodiments, the filter aid may be formed into sheets, pads, cartridges, or other monolithic or aggregate media capable of being used as supports or substrates in a filtration process. Considerations in the manufacture of filter aid may include a variety of parameters, including but not limited to total soluble metal content of the composition, median soluble metal content of the composition, particle size distribution, pore size, cost, and availability.

In some embodiments, the filter aid may be applied to a filter septum to protect it and/or to improve clarity of the liquid to be filtered in a filtration process. In some embodiments, the filter aid may be added directly to a beverage to be filtered to increase flow rate and/or extend the filtration cycle. In some embodiments, the filter aid may be used as pre-coating, in body feeding, or a combination of both pre-coating and body feeding, in a filtration process.

Embodiments of the filter aid may also be used in a variety of filtering methods. In some embodiments, the filtering method may include pre-coating at least one filter element with the filter aid, and contacting at least one liquid to be filtered with the at least one coated filter element. In such embodiments, the contacting may include passing the liquid through the filter element. In some embodiments, the filtering method may include suspending a filter aid in at least one liquid containing particles to be removed from the liquid, and thereafter separating the filter aid from the filtered liquid.

Filter aids disclosed herein may also be employed to filter various types of liquids. In some embodiments, the liquid is a beverage. Exemplary beverages include, but are not limited to, vegetable-based juices, fruit juices, distilled spirits, and malt-based liquids. Exemplary malt-based liquids include, but are not limited to, beer and wine. In some embodiments, the liquid is one that tends to form haze upon chilling. In some embodiments, the liquid is a beverage that tends to form haze upon chilling. In some embodiments, the liquid is a beer. In some embodiments, the liquid is an oil. In some embodiments, the liquid is an edible oil. In some embodiments, the liquid is a fuel oil. In some embodiments, the liquid is water, including but not limited to waste water. In some embodiments, the liquid is blood. In some embodiments, the liquid is a sake. In some embodiments, the liquid is a sweetener, such as, for example, corn syrup or molasses.

EXAMPLES

A number of acid washing or leaching factors, such as, for example, leach time, temperature, acidic species, acid concentration, and percentage solids, were varied to gain an understanding the relationships between the acid leaching conditions and purity for a filter aid including commercially available diatomaceous earth. The list of conditions is provided below in Table 1.

TABLE 1

|  | Minimum | Maximum |
|---|---|---|
| Leach Time (hours) | 0.5 | 14 |
| Leach Temperature (° C.) | 23 | 80 |
| Leaching Acid(s) | Sulfuric, Citric | |
| Acid Concentration (N) | 0.025 | 1 |
| % solids | 0.1 | 0.2 |
| Diatomite Feed, FCC As/EBC BSI (ppm) | 4.5/75 | 8/65 |

Acid-Wash

A sample of 50 grams of diatomaceous earth feed was added to 280 mL of acidic solution. The mixture was then shaken at 250 rpm using a laboratory flask shaker or shaker oven at desired temperature. After a period of two hours, the mixture was vacuum-filtered through a filter paper-lined (Whatman No. 4) Buchner funnel. The resulting filter cake was then rinsed with deionized water until the filtrate conductivity dipped below 10 µS/cm. The rinsed filter cake was then dried at a temperature of 105 degrees C. for a minimum of two hours. The dried filter cake was then dispersed through a 30 mesh (Tyler) screen.

Double Acid Wash

To wash the same material twice, a rinsed filter cake (still wet) was re-slurried in a fresh acidic solution, and was shaken at 250 rpm at the desired temperature, rinsed, dried, and dispersed as in the single acid wash procedure.

Analysis of Extractable Metals

Trace metal quantities were determined in accordance with the FCC (Food Chemical Codex) method for filter aids. A 50 mL amount of 0.5 N hydrochloric acid was added to 10.0 grams of filter aid. This mixture was shaken at 70 degrees C. for fifteen minutes, then filtered and rinsed. The resulting filtrate was diluted to 100.0 mL and subjected to ICP-MS analysis.

Beer soluble iron (BSI) was determined using the European Beer Convention (EBC), in which 5.0 grams of filter aid was contacted with potassium hydrogen phthalate (KHP) for two hours at room temperature, and then filtered. The resulting filtrate was analyzed via colorimetric assay with a ferrozine indicator (with ascorbic acid to reduce ferrous iron) for iron content.

Results

The objective of the leaching experiments was to find a set of acid washing conditions that reduced the soluble metal content to a more desirable amount. As shown in FIGS. 1-5, one unexpected result was that lower acid concentrations at ambient conditions (temperature and pressure) resulted in lower FCC extractable metals, as shown in FIG. 1. As shown in FIG. 1, light acid wash conditions also reduce EBC beer soluble iron (BSI), and the largest reductions occurred at the lower acid concentrations.

Figure 2:
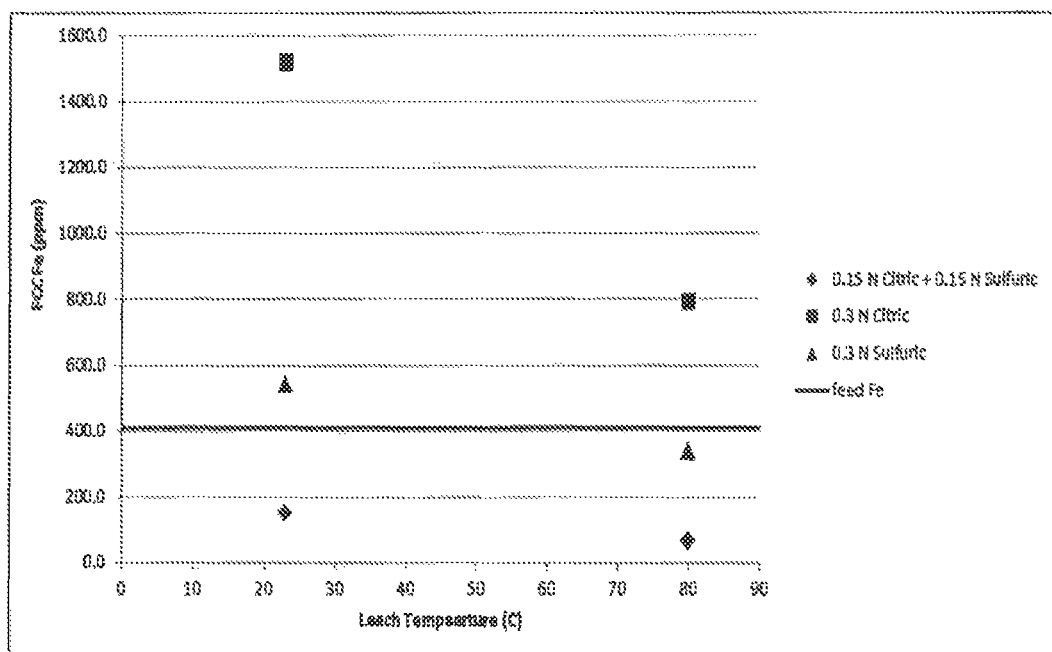
FIG. 2 is a graph showing FCC extractable iron for a diatomaceous earth sample as a function of temperature, single acids, and a mixture of organic and mineral acids.
Figure 3:
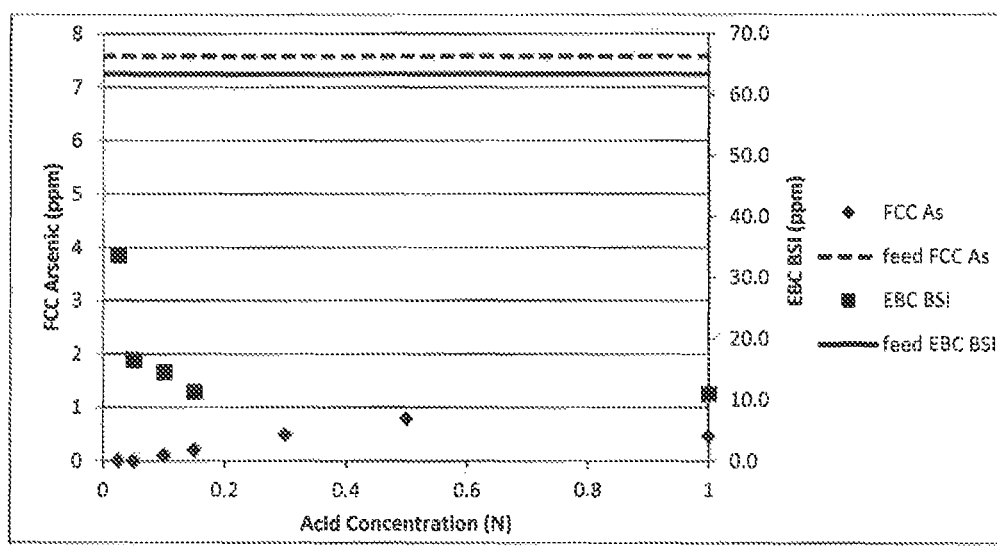
FIG. 3 is a graph showing FCC extractable arsenic and EBC beer soluble iron for a diatomaceous earth sample as a function of varying leaching concentration of sulfuric acid at room temperature, with the bars being the levels in the feed material.
Figure 4:
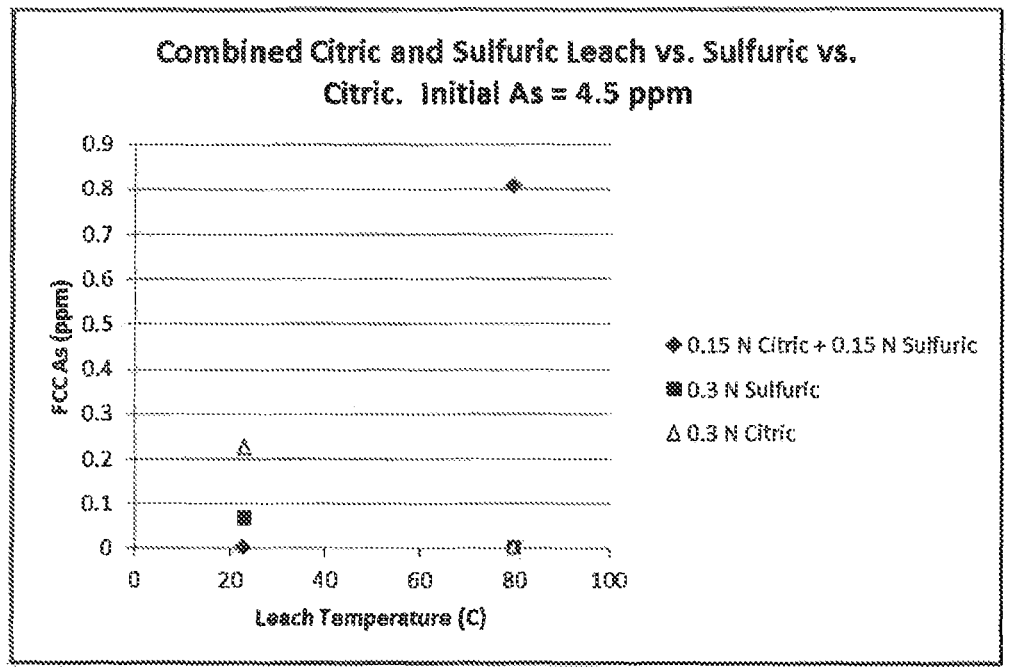
FIG. 4 is a graph showing FCC extractable arsenic for a diatomaceous earth sample as a function of temperature, single acids, and a mixture of organic and mineral acids.

FIG. 2. shows that even greater reductions in FCC extractable iron can be seen by mixing acids and leaching at room temperature (i.e., improvements over single acids). At elevated temperatures, the single acids reduce the FCC extractable iron levels. However, at ambient temperatures the FCC extractable iron levels can be reduced even further over a single acid by the appropriate mixing of acids. Likewise, as shown in FIG. 3, similar reductions can be seen with FCC extractable arsenic at ambient temperatures. FIG. 4. shows the impact of temperature, acid type, and mixed acids on the FCC extractable arsenic.

Filtration Performance

Figure 5:
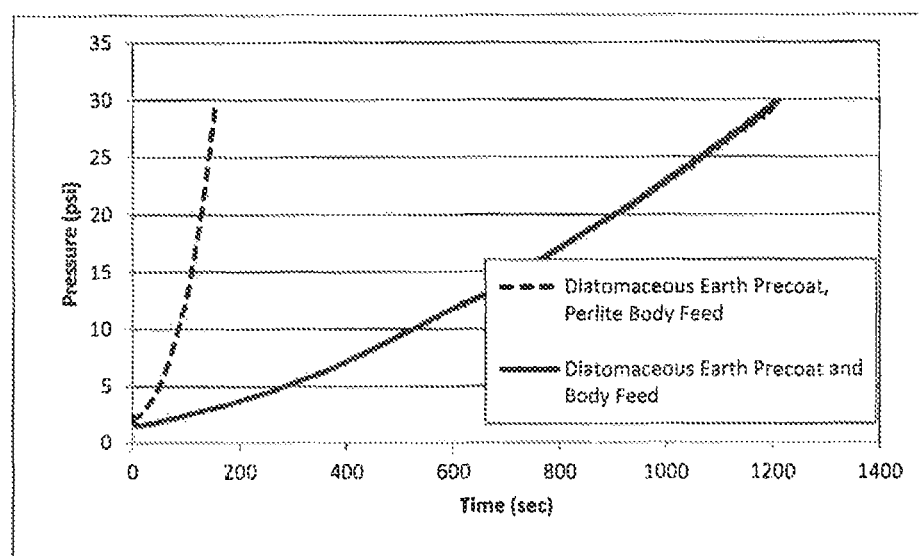
FIG. 5 is a graph showing Walton filtration pressure over time for grape juice concentrate using acid-washed diatomaceous earth in pre-coat for both samples, and comparing in the body-feed of the diatomaceous earth with perlite.
Figure 6:
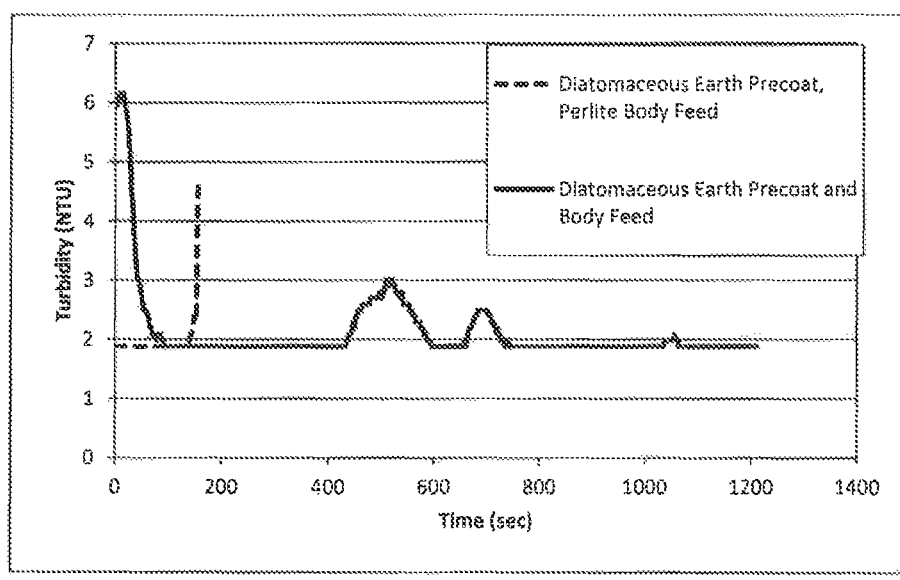
FIG. 6 is a graph showing Walton filtration clarity (turbidity) over time for grape juice concentrate using acid-washed diatomaceous earth in pre-coat for both samples, and comparing in the body-feed of the diatomaceous earth with perlite.
Figure 7:
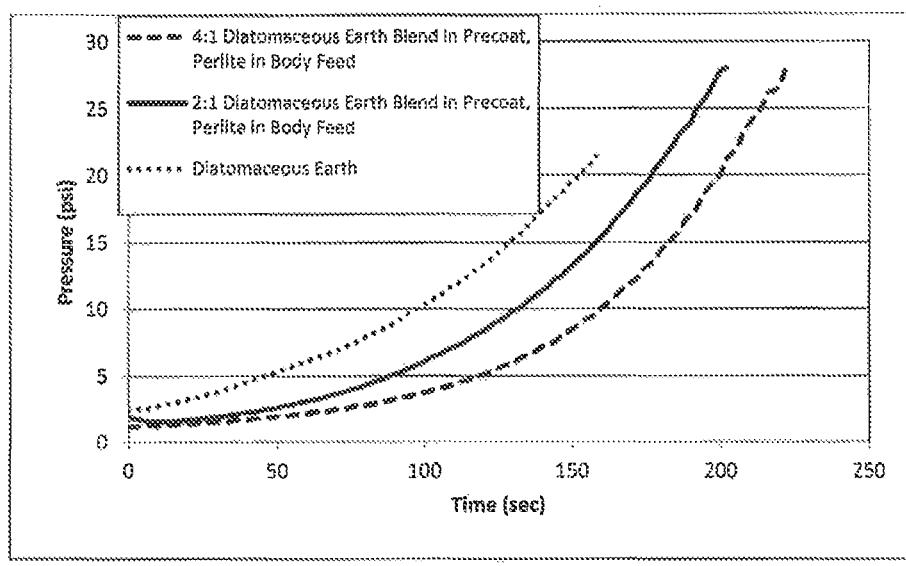
FIG. 7 is a graph showing Walton filtration pressure over time for grape juice concentrate using acid-washed diatomaceous earth blends with high permeability diatomaceous earth in pre-coat and perlite in body feed.

Filtration performance with grape juice concentrate was tested with a Walton Filtration system. FIGS. 5 and 6 show the filtration performance of acid-washed diatomaceous earth in the pre-coat and body feed vs. only in the pre-coat and perlite in the body feed. As shown, the filtration performance is improved with a 100% acid-washed diatomaceous earth system, but such a filter aid may be undesirably costly. FIGS. 6 and 7 show that blends of acid-washed diatomaceous earth and perlite in the pre-coat improves filtration cycle time without compromising clarity.

Figure 8:
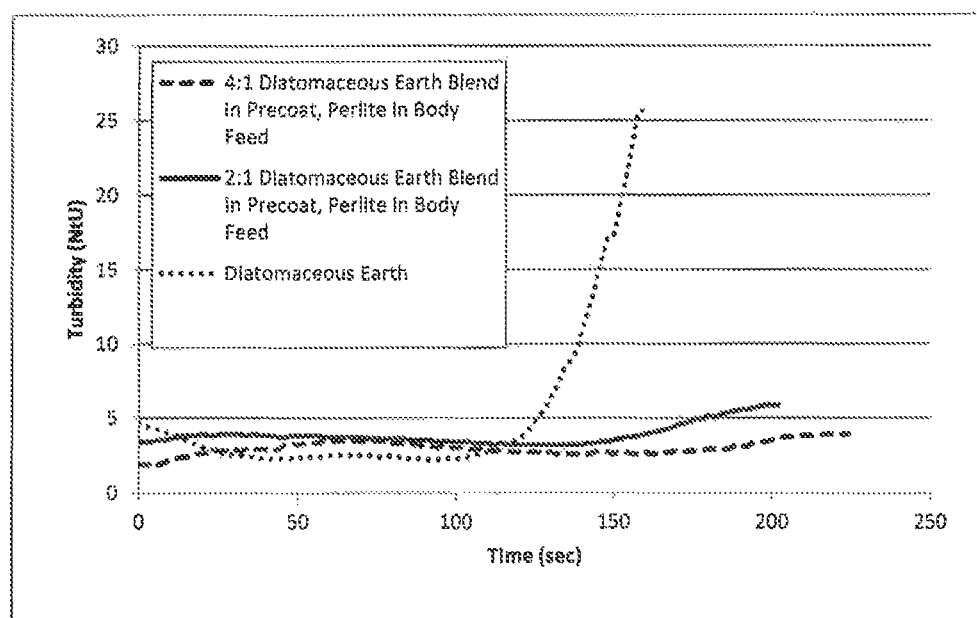
FIG. 8 is a graph showing Walton filtration clarity over time for grape juice concentrate using acid-washed diatomaceous blends with high permeability diatomaceous in pre-coat and perlite in body feed.

FIG. 8 shows Walton filtration clarity over time for the grape juice concentrate using acid-washed blends of high and low permeability diatomaceous earth in pre-coat and perlite in the body feed.

Figure 9:
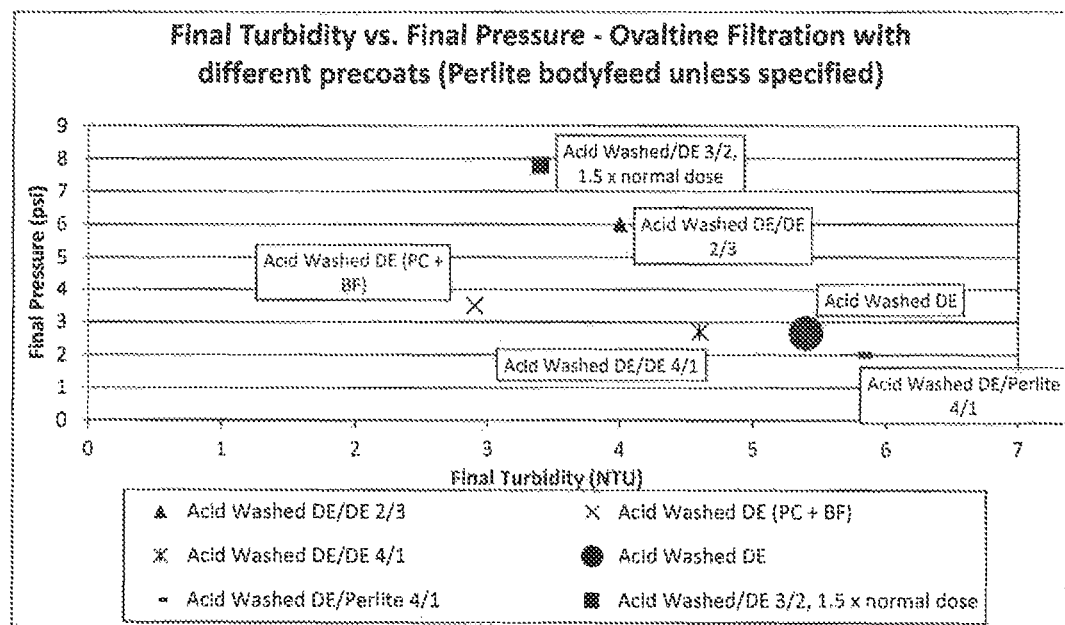
FIG. 9 is a graph showing a final pressure and turbidity map using ovaltine filtration and comparing various blends of pre-coat including different grades of diatomaceous earth and/or perlite.

Ovaltine Filtration model studies were performed to determine pressure-clarity tradeoffs with different pre-coat blends. FIG. 9 shows the results of the studies.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a filter aid, the method comprising:
    acid washing diatomaceous earth to reduce the trace amounts of extractable metal in the diatomaceous earth;
    rinsing the acid-washed diatomaceous earth with water in order to remove the acid; and
    combining the acid-washed diatomaceous earth with perlite to obtain a filter aid;
    wherein acid washing the diatomaceous earth comprises:
        in a first washing step, washing the diatomaceous earth in a first acid comprising an inorganic acid; and
        in a second washing step that follows the first washing step, washing the diatomaceous earth in a second acid comprising an organic acid.

2. The method of claim 1, wherein the first acid has a first acid strength and the second acid has a second acid strength different than the first acid strength.

3. The method of claim 2, wherein the first acid strength is greater than the second acid strength.

4. The method of claim 2, wherein the first acid strength is 0.5 Normal or less.

5. The method of claim 2, wherein the second acid strength is 0.3 Normal or less.

6. The method of claim 1, wherein the acid washing occurs at a temperature of 60 degrees C. or less.

* * * * *